May 10, 1966    R. McKINVEN, JR    3,250,541
RADIAL LIP SEALS
Filed March 8, 1962    4 Sheets-Sheet 3
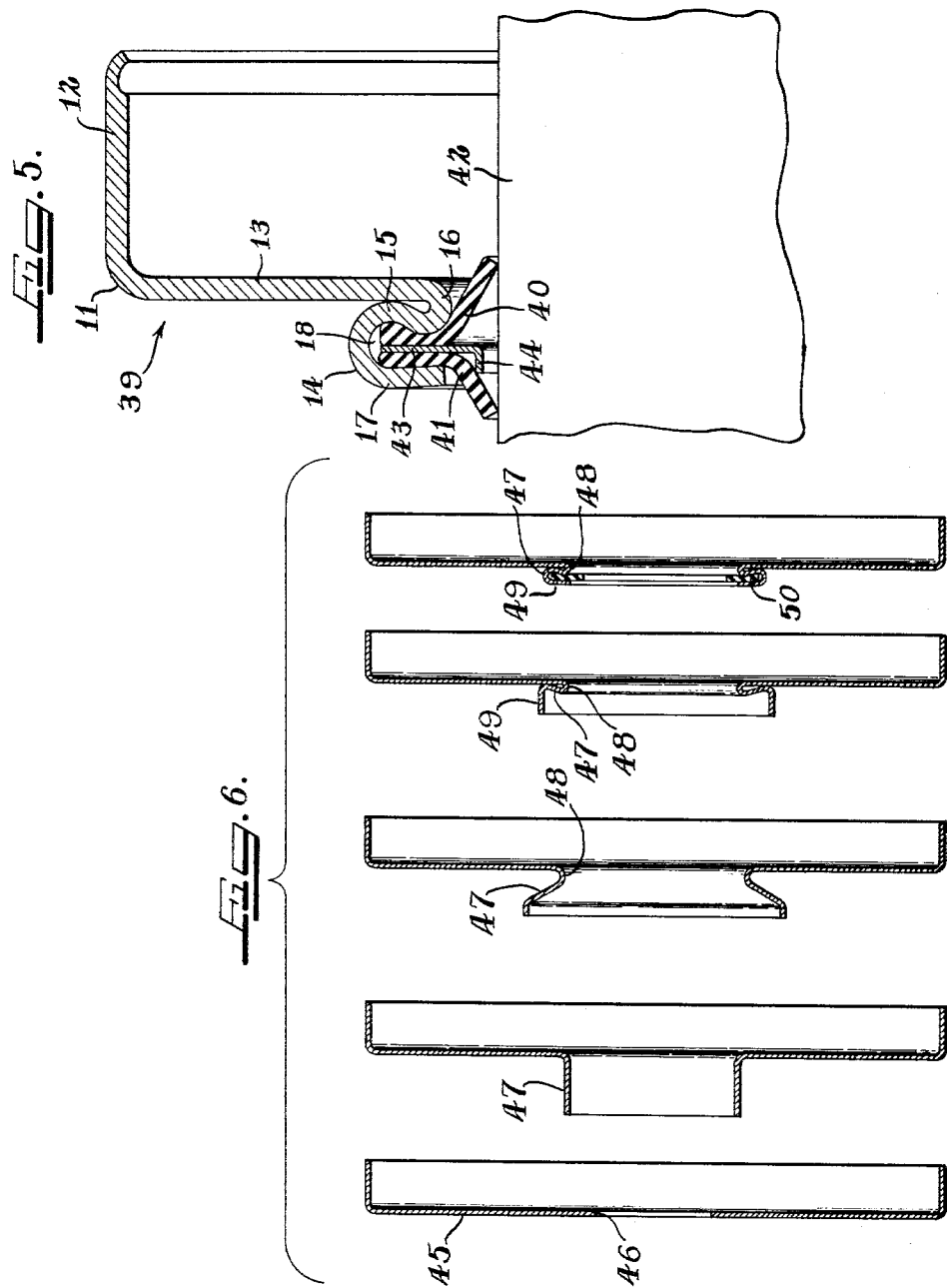

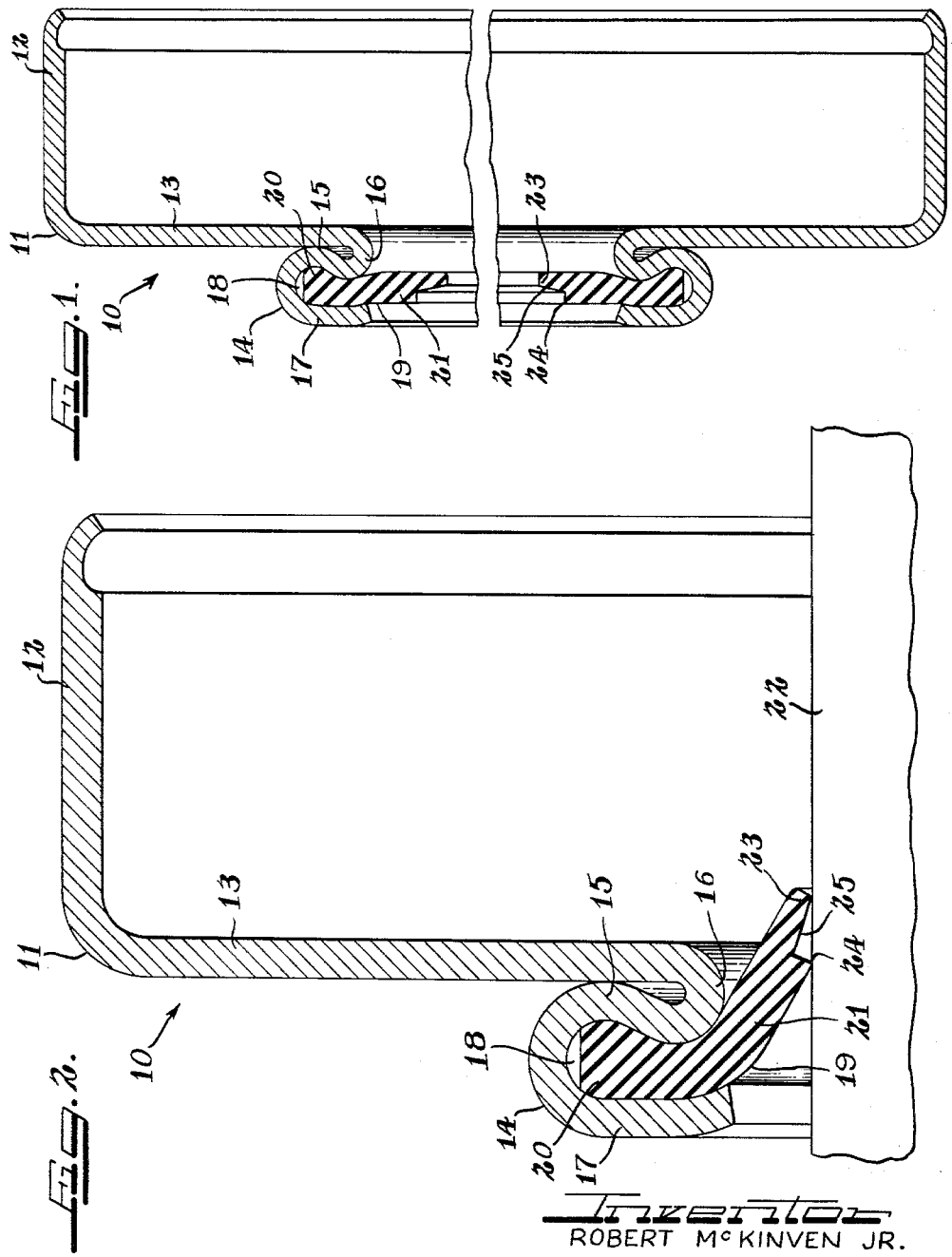

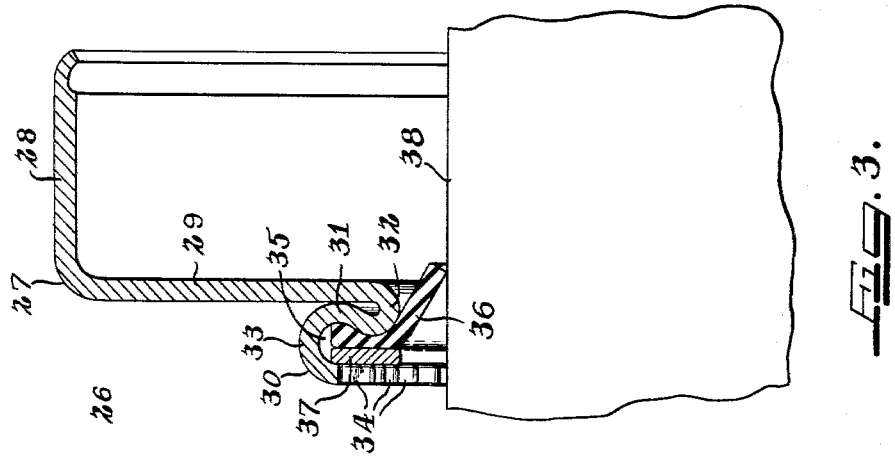
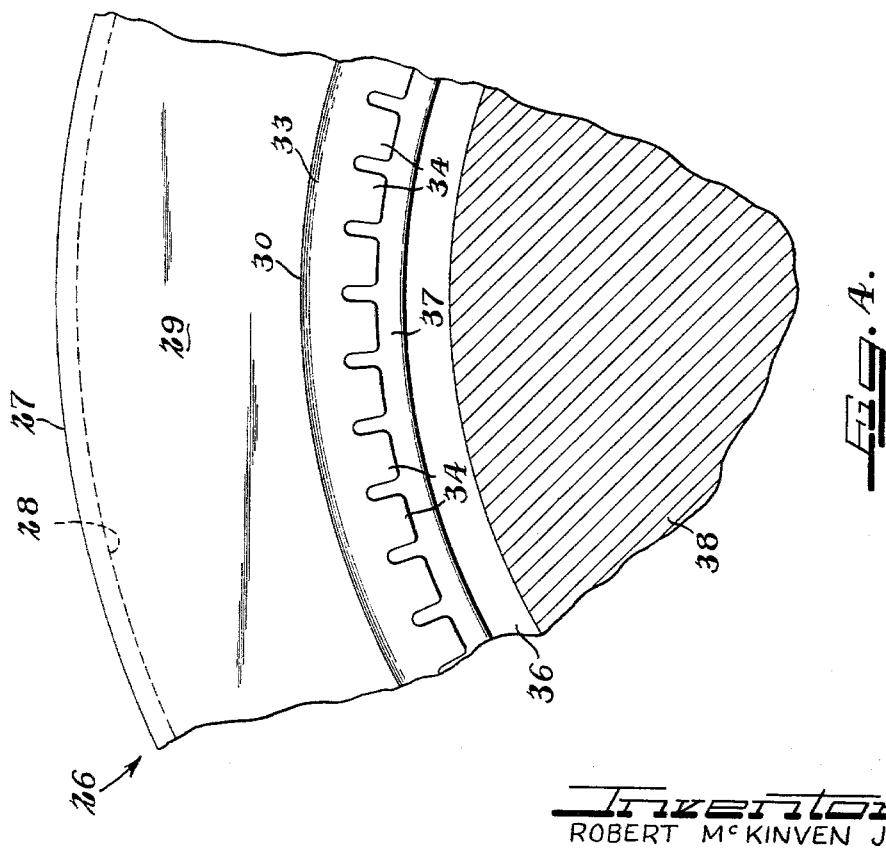
Inventor
ROBERT McKINVEN JR.
by Cromwell, Greist & Warden
Attys.

May 10, 1966  R. McKINVEN, JR  3,250,541
RADIAL LIP SEALS
Filed March 8, 1962  4 Sheets-Sheet 4
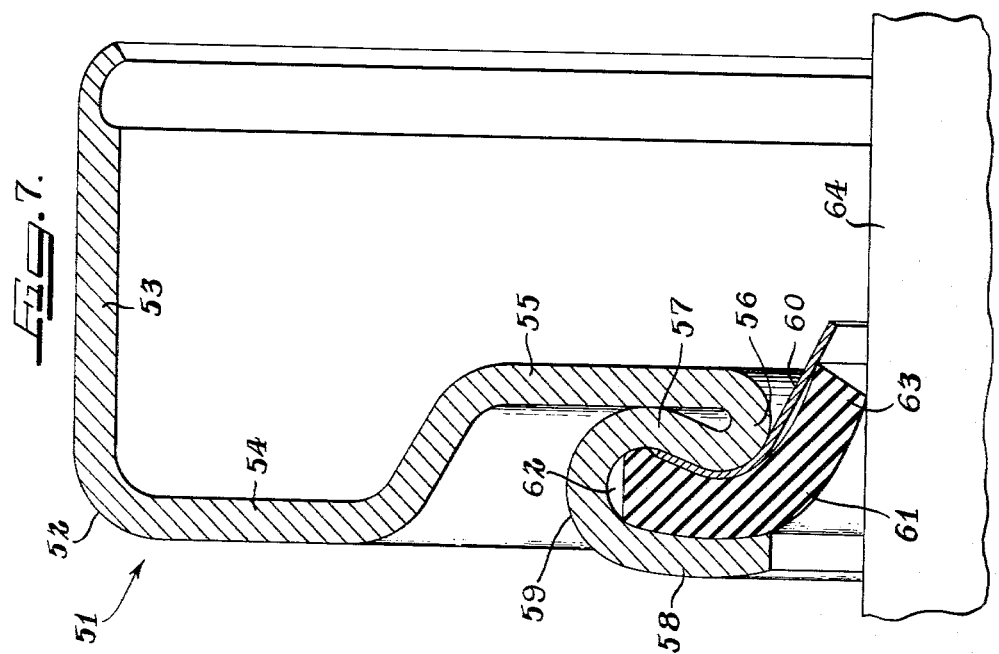
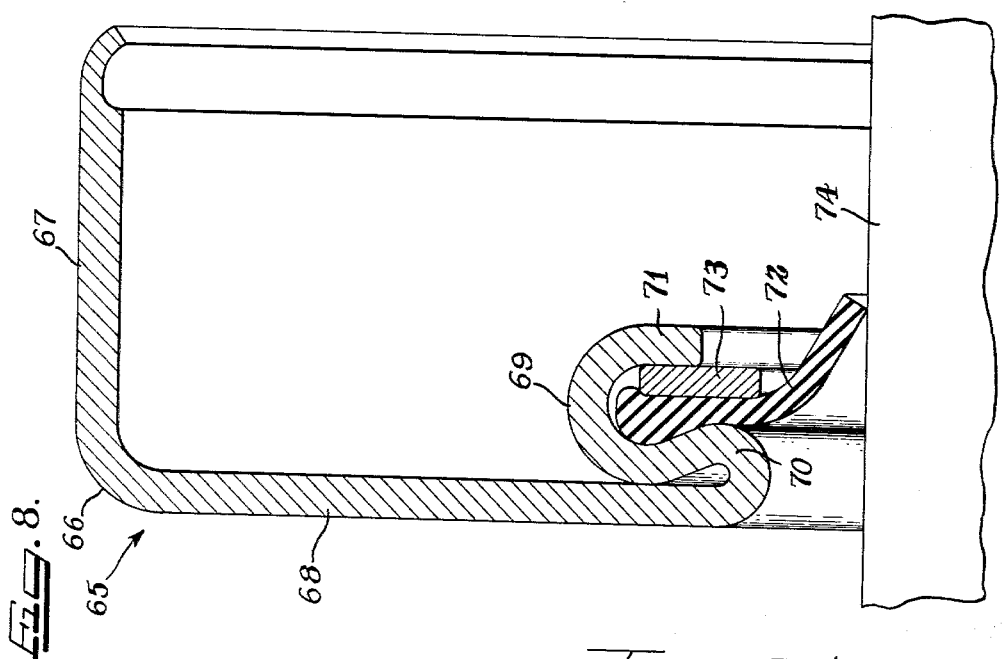
Inventor
ROBERT McKINVEN JR.
by Cromwell, Greist & Warden
Attys.

United States Patent Office 3,250,541
Patented May 10, 1966

3,250,541
RADIAL LIP SEALS
Robert McKinven, Jr., Detroit, Mich., assignor to Chicago Rawhide Mfg. Company, Chicago, Ill., a corporation of Illinois
Filed Mar. 8, 1962, Ser. No. 178,390
6 Claims. (Cl. 277—182)

This invention relates to new and improved radially acting seals adapted for application to a shaft or the like mounted in a shaft housing wherein either the shaft or housing is designed for rotation. More specifically, the invention is directed to a new and improved type of oil seal of economical, efficient and uncomplicated design including as a part thereof a specially formed sealing element mounting member uniquely adapted for the mounting of flexible, normally flat sealing elements formed from generally non-compressible material such as rubber and especially plastic materials such as polytetrafluoroethylene and other fluorocarbons.

The basic cartridge-type shaft seal makes use of a metallic casing or stamping adapted to be fixedly mounted in a shaft housing and having attached thereto a flexible sealing member which is fixed to the casing and is radially flexed in running sealing engagement with a shaft. This basic seal design has been used for many years and the sealing members have been formed from leather, fabric impregnated with rubber, synthetic rubber, or felt. It has been the general design practice to spring load the flexible sealing lip portion of the sealing member such as by encircling the same with a garter-type coil spring which functions to resiliently hold the sealing lip portion of the sealing member against the shaft during rotation of the shaft. To provide for positive spring mounting and retention, it has been the further practice to preform or preshape the sealing member, such as by molding or machining, to an extent that a spring mounting groove is supplied and/or make use of an extra telescoped stamping to engage the spring to hold the same in place. This practice has led to the preforming or preshaping of sealing members having at least the sealing lip portions thereof of special configuration in an effort to improve the sealing functioning thereof. Contemporary synthetic rubber seals normally make use of a carefully designed spring groove, spring, and sealing lip portion in an effort to maintain accurate relationship between the spring load and the sealing lip portion in order to establish and maintain an efficient sealing action.

If it can be said that during the last 30 years seal design considerations have followed a cycle, it is pointed out that the first designs merely made use of a flexible washer or packing of felt, leather, etc., which packing was clamped in a stamping or the like for shaft application. This type of seal while being of very simple design and capable of low cost manufacture did not provide an adequate range of application and was found to be basically successful largely in connection with the sealing of grease, the excluding of foreign matter, and other functions of similar, less critical or demanding nature. In an effort to provide seals capable of more critical applications, such as the sealing of oils and other lower viscosity fluids, the industry turned to the spring-loaded designs described above. These designs are more complex and more expensive and are limited in application in connection with space limitations, life of the various components formed from different materials, etc. With the development of improved plastics, such as the fluorocarbons, attempts have been made to utilize the desirable properties of these materials in permitting a return to the less complicated seal designs in hopes that the properties of the new materials will eliminate the necessity of design complexities such as spring loading and special sealing lip preforming. To at least a certain extent the improved plastic materials have fulfilled the hopes of the industry and considerable use has been made of materials such as polytetrafluoroethylene. However, it has been found that with the use of new materials, while certain of the earlier limitations in application of the simpler designs have been overcome, new problems have arisen. Furthermore, as a result of advancements in equipment designs involving seal applications, additional problems and requirements have been imposed. Accordingly, the seal industry has not found it generally possible to merely substitute the newer materials in the earlier and limited seal designs on the premise that the use of the new materials per se will adequately overcome the basic limitations existing in the application and use of the earlier designs.

It is an object of the present invention to provide new and improved seals of uncomplicated design and improved efficiency as well as wider range of useful application.

A further object is to provide new and improved seals of a design using a minimum number of parts while providing for improved efficiencies permitting wider application and improved functioning of flat washer-like sealing elements formed from flexible, generally noncompressible material.

Still another object taken in conjunction with the foregoing objects is to provide a new and improved seal making use of a specially designed radially opening sealing element mounting portion which particularly accommodates the use of simple washer-type sealing elements without spring loading or the like in a new and improved manner.

Other objects not specifically set forth will become apparent from the following detailed description of the invention made in conjunction with the accompanying drawings wherein:

FIG. 1 is a fragmentary section of one form of improved seal illustrating the same prior to installation thereof;

FIG. 2 is an enlarged half section of the seal of FIG. 1 illustrating installation thereof;

FIG. 3 is a half sectional view of a modified form of seal in its installed condition;

FIG. 4 is a fragmentary end view of the seal of FIG. 3;

FIG. 5 is a view similar to FIG. 3 illustrating still another modified form of seal;

FIG. 6 constitutes a series of sectional views of a stamping undergoing forming operations during fabrication of the seal of the invention;

FIG. 7 is a half sectional view of still another modified form of seal illustrated in installed condition; and FIG. 8 is a view similar to FIG. 7 illustrating still another modification of the basic seal design of the invention.

Referring to FIGS. 1 and 2, the basic design considerations of the present invention will be described. The seal 10 illustrated is formed from annular elements and includes a metallic casing or stamping 11 having an axial outer peripheral portion 12 adapted for press fitting in a shaft housing and a radially inwardly directed portion 13 terminating along the inner periphery thereof in a specially designed and arranged sealing element mounting portion 14. This portion is defined by the double reversely folding or bending of the peripheral or marginal portion of the radial portion 13 of the stamping 11. Specifically, a marginal area 15 extends reversely outwardly along the adjacent portion on the radial portion 13 in a direction which is defined by an arcuately bowed juncture 16. The marginal area 15 thus is directed axially outwardly from the radial portion 13 by reason of the enlarged bowed juncture or portion 16 and is then directed inwardly toward the radial portion 13 into engagement therewith. Thus the marginal area 15 extends reversely along the radial portion 13 into arcuately inwardly directed engagement therewith at a point spaced inwardly from the terminus of the radial portion 13, this terminus being generally defined by the bowed portion 16.

The marginal area 15 beyond its points of engagement with the radial portion 13 extends arcuately outwardly therefrom in a generally axial direction and ultimately integrally joins a radially inwardly extending leg portion 17. This leg portion overlies the reversely extending marginal area 15 in spaced relation thereto and the terminal edge of the leg portion 17 is opposite the bowed portion 16 previously described. With this arrangement the sealing element mounting portion 14 defines internally thereof an enlarged semi-cylindrical annular area 18 provided with a radially directed opening which is defined between the terminus of the leg portion 17 and the bowed portion 16. Thus, the mounting portion 14 defines internally thereof a sealing element mounting groove of generally radially opening U-shape internal configuration with the base of the configuration (which is inverted in the particular form of seal illustrated, the base being generally designated by the internal semi-cylindrical area 18) being substantially enlarged as compared to the opening defined between the leg portion 17 and the bowed area 16. In the form illustrated, the leg portion 17 along its terminal edge is directed toward the bowed portion 16 to provide an important and desired constriction of the opening of the sealing element mounting groove.

A sealing element 19 of generally flat, washer-like configuration completes the seal 10. The sealing element 19 may be generally referred to as a "packing" and its outer peripheral portion 20 is received in the groove defined by the sealing element mounting portion 14 in clamped relation between the leg portion 17 and the bowed portion 16. The peripheral portion 20 of the sealing element 19 is expanded in the internal semi-cylindrical area 18 of the mounting groove by reason of the clamping action afforded by the cooperating leg and bowed portions. A relatively thin, readily flexible sealing lip portion 21 projects freely from the mounting groove and is arranged for sealing engagement with a shaft 22 in the manner shown in FIG. 2.

In the design of seals, particularly those of uncomplicated arrangement wherein the flexible sealing element is actually clamped in some manner by suitable casing or housing elements, there are several important considerations which contribute to design complexities. For example, the generally non-compressible materials, such as rubber and fluorocarbons, when clamped by cooperating metallic portions of the housing or casing are subjected to forces causing "extrusion" of the material of the sealing element. If such extrusion is not controlled, the presence of internal stresses or bulging masses of the material in certain locations can materially adversely effect the performance of the sealing lip portion. By way of example, if extrusion occurs in the area of the bend point of a simple washer-type element, the stresses developed and the massing of sealing element material can completely modify the sealing action to an undesirable extent and performance is either below standard or cannot be adequately predicted. While there is no marked or necessarily observable extrusion of the material of the sealing element when the same is clamped between metallic parts, the displacement of the material is sufficient to effect the sealing action and, therefore, must be taken into consideration with regard to seal design. As a result, the industry has tended to utilize specially shaped sealing elements in combination with spring loading so as to obtain controlled and reproducible results.

The particular design of the sealing element mounting portion 14 described above provides for controlled extrusion of the material of the sealing element. The enlarged internal area of the mounting portion is sufficient to accommodate therein all of the material of the sealing element, which is displaced by reason of the clamping action of the terminus of the leg portion 17 in conjunction with the bowed portion 16. Furthermore, the clamping action is controllably located to be concentrated and take place at the point where the sealing element actually leaves the mounting portion and the clamping action is directed to provide for extrusion of the sealing element inwardly into the interior of the mounting groove. With this arrangement the undesirable influence of sealing element extrusion on sealing action is adequately removed and the simplified seal design involving the use of a flat washer-type sealing element exhibits greater efficiency in preventing leakage of low viscosity fluids and has a much wider application.

The localized "squeeze" or clamping action afforded by the design described provides for highly efficient internal gasketing. This prevents leakage between the sealing element and the casing in a very simple manner. It has been found that where a casing or stamping is bent to clamp the sealing element, the clamping force may be greater along one surface than along the opposite surface. This is particularly true where the clamping force is applied over a fairly substantial area. In this connection the unbalance of clamping force application has been a serious problem with regard to proper internal gasketing. However, this problem is overcome in the present design by reason of the provision of the enlarged internal area of the sealing element mounting portion 14 permitting extrusion of the material of the sealing element thereinto. Consequently, adverse effects resulting from unbalanced clamping action are overcome by permitting the material of the sealing element to adjust itself by controlled extrusion thereof into the interior of the mounting groove. Furthermore, the provision of the bowed portion 16 specifically for cooperation with the terminus of the leg portion 17 aids in promoting uniformity in the application of clamping forces. This is due largely to the utilization of a line contact clamping action.

With the use of the improved plastic sealing materials such as the fluorocarbons, additional problems have arisen. The coefficient of thermal expansion of these materials is very substantially greater than the coefficient of expansion of steel used in forming the casing or housing. It has been found important to minimize the influence of these diverse properties by utilizing a relatively narrow section of the plastic material. Accordingly, the seal design of the present invention is particularly adapted for use with these plastic materials as the special mounting portion provides for efficient mounting of a relatively thin, flat washer-like sealing element. Furthermore, spring loading of the sealing element is not required in order to obtain efficient sealing action in a wide range of applications. As best shown in FIG. 2, the design permits the placing of the bend point of the sealing element 19 into close association with the shaft 22 thus reducing the required radial length of the sealing lip portion 21. The inherent spring action of the relatively thin sealing element is utilized to full advantage by reason of the close placement of the sealing element mounting portion 14 relative to the shaft 22. This feature is also of material importance with regard to utilization of the seal 10 in applications of limited seal mounting areas. The close spacing of the sealing element mounting portion 14 relative to the shaft 22 further permits minimizing of the compressive set properties of rubber and fluorocarbons. Within economical considerations, less sealing element material is utilized. In connection with fluorocarbons, the thin sections also tend to minimize the influence of cold flow. While spacing is of importance as described, it must also be borne in mind that the particular positive clamping of the sealing element afforded by the special design of the mounting portion 14 also tends to minimize the influence of compressive set. Fluorocarbons are often difficult to bond to metal surfaces and the particular clamping action afforded in the seals of the present invention eliminates this problem.

The sealing lip portion 21 of the sealing element 20 illustrated in FIGS. 1 and 2 may be provided with a pair of tandem lips 23 and 24 separated and defined by a radial, generally V-shaped groove 25 which is inclined axially rearwardly relative to the leading lip 23. These lips are dimensioned for independent sealing action against the shaft 22. In certain applications, it may be desirable to provide for the double lip configuration in the sealing element 21 of FIGS. 1 and 2. Under given circumstances a "bell-mouthing" effect occurs by reason of the sealing lip being permanently expanded beyond its initial surface engaging dimension. This effect will normally occur during the breaking-in period of the seal and the leading lip 23 of the sealing element 19 is intended to protect the secondary lip 24 from the "bell-mouthing" effect. The leading lip 23 also may provide a baffle effect to protect the lip 24 from foreign matter or the like thus maintaining high efficiency in the lip 24. The particular shape of the groove 25 cut into the sealing element 19 to define the lips 23 and 24 permits the secondary lip 24 to supply a cleaning action to the shaft 22 during operation.

The advantages of the basic design features of the present invention may be utilized in conjunction with a number of modifications, one of which is shown in FIGS. 3 and 4. The seal 26 similarly includes a stamping 27 having an axially extending press fit portion 28 and a radial portion 29 terminating in the specially designed sealing element mounting portion 30. This mounting portion is defined by a reversely extending area 31 joined with the inner edge of the radial portion 29 by a bowed portion 32 and extending outwardly in an arcuate, axially directed portion 33 which terminates in a plurality of circumferentially spaced, radially inwardly directed clamping fingers 34. The radially opening mounting groove 35 defined by the portions of the casing 27 described is of the same configuration as previously described including an enlarged semi-cylindrical area into which the material of a flat washer-like sealing element 36 is extruded or expanded. Also received in the groove 35 is a flat metallic washer 37 which is in clamped engagement with the peripheral marginal portion of the sealing element 36 received in the groove 35 and which functions between the fingers 34 and the bowed portion 32 to clamp the sealing element in its mounted condition. The use of the washer 37 is advantageous where small shaft sizes are involved and/or heavier gauge material is used in forming the casing 27 and it is difficult to uniformly bend a continuous leg portion, such as the leg portion 17 of FIGS. 1 and 2 into proper clamping engagement with the sealing element and to the extent desired to obtain the improved results of the design. Under such circumstances the flat washer 37 is used as a substitute for a continuous clamping leg portion and the separate fingers 34 of heavier gauge material are readily subject to adequate bending to impart to the washer 37 the requisite clamping action. FIGS. 3 and 4 illustrate the seal 26 in installed relation to a shaft 38. The particular design described is also especially useful in the forming of small diameter seals for use with small shafts.

The seal 39 of FIG. 5 is of the same basic design as the seal 10 of FIGS. 1 and 2 with the exception that a modified type of sealing element is used. In describing this design, similar reference numerals are used to identify the parts identical with those of the seal 10 of FIGS. 1 and 2. The seal 39 makes use of a pair of normally flat, washer-like sealing elements 40 and 41 including projecting flexible sealing lip portions which are oppositely directed along the shaft 42. Thus one of the sealing elements may function as a dirt excluder and the other as an oil seal. To provide for ease of installation in connection with maintaining opposite direction of the sealing elements, a special washer-like stamping 43 is mounted in the sealing element mounting portion 14 between the sealing elements 40 and 41. The stamping 43 includes an annular radially extending portion clamped between the sealing elements within the mounting groove and terminates along the inner periphery thereof in an axial directed flange portion 44 which engages the inner face of the sealing element 41 to control the flexure thereof away from the remaining sealing element 40. Thus when the seal 39 is received about the shaft 42, the direction of shaft insertion is toward the right as viewed resulting in the flexing of the sealing element 40 into the position illustrated. During shaft insertion the flexed positioning of the sealing element 41 is maintained by the flange 44 of the samping 43. This particular seal design is further illustrative of the several modifications permissible in use of the basic design features of the present invention thus readily adapting the seal for use in many different types of applications.

The forming of the sealing element mounting portion of the seal of the invention may be readily accomplished by a series of stamping operations. Thus the particular configuration of the mounting portion is susceptible to standard forming operations without attendant special costs. In FIG. 6 a standard blank cup 45 is first formed with a central aperture 46 therein. The marginal portion 47 defining the aperture 46 is extruded to form an axially projecting collar portion. This collar portion is then flared to initially define the bowed portion 48 which has been designated as 16 in FIG. 1 and 32 in FIG. 3. The collar 47 is then formed with an upset 49 resulting in engagement of the collar in reversely directed relation with the adjacent surface of the radial portion of the stamping. A sealing element 50 is then laid in place and the upset 49 is formed downwardly over the sealing element to clamp the same. This last forming step results in the forming of the leg portion 17 and clamping fingers 34 previously described. The forming operations are uncomplicated and the particular design of sealing element mounting portion is such that slight variations in metal thickness, drawn height or applied force will be accommodated by the design to still afford proper sealing element mounting and efficient sealing operation. Variations of this type will affect the extrusion of the material of the sealing element and it will be understood that by the provision of the enlarged channel or mounting groove, variations in extrusion are readily accommodated. The direction of final force application for sealing element clamping in conjunction with the provision of the bowed portion 48 is such that extrusion will occur outwardly into the interior of the mounting groove. At least the last sealing element clamping step can readily be carried out in a mold simultaneous with rubber shaping and bonding. The stamping configuration of the invention provides for the forming of an excellent bond.

FIG. 7 illustrates other modifications available in seal design in accordance with the principles of the invention. The seal 51 includes a casing 52 having an axially extending press fit portion 53, a radially extending portion 54 and an axially offset radial portion 55 which is integral with the portion 54. The axially offset radial portion 55 along its marginal portion is formed with a bowed area 56 of the type previously described defining a reversely directed portion 57 which curves upwardly and outwardly and at its terminus defines a leg portion 58. Thus the earlier described sealing element mounting groove 59 is formed in axially offset relation within the casing 52. This design variation may be of importance with regard to axial space limitations in seal application and the seal of the present invention is readily adapted to this variation.

The seal 51 of FIG. 7 also illustrates the use of an annular leaf spring member 60 in conjunction with the flexible sealing element 61. The leaf spring member 60 is clamped in the sealing element mounting groove 62 in overlying relation with the sealing element 61 and extends outwardly therefrom in at least partial engagement with the flexible sealing lip portions 63 of the sealing element. The leaf spring 60 functions to resiliently urge the flexible sealing lip portion 63 into engagement with the shaft 64. In this manner, auxiliary spring means may be readily accommodated in the basic seal design without the necessity of using specially shaped sealing elements adapted to accommodate garter springs or the like. A spring member may be desirable in seal designs of large diameter wherein the amount of sealing element material used is rather substantial and the inherent resiliency thereof may not be considered adequate for efficient sealing action.

The seal 65 of FIG. 8 illustrates still another design modification wherein the sealing element mounting portion is formed on the interior of the radial portion of the casing. This seal includes a casing 66 having an axial press fit portion 67 joined with a radial extending portion 68 which terminates in a sealing element mounting portion 69 including a bowed portion 70 and a clamping leg portion 71. The mounting portion 69 is of the same general configuration previously described. A sealing element 72 is mounted in the mounting portion 69 and is clamped therein between the terminus of the leg portion 71, a washer 73 and the bowed portion 70. The washer 73 is used for the same purpose as the washer 37 described above in connection with FIG. 3, the leg portion 71 being of circumferentially continuous configuration as distinguished from the provision of the locking fingers 34 previously described. The flexible sealing lip portion of the sealing element 72 engages a shaft 74. FIG. 8 illustrates the ready adaptability of the basic design features of the present invention to specific seal applications wherein the sealing element mounting portion is mounted internally of the casing thus further providing for additional savings in space required for seal installation.

The configuration of sealing element mounting portion used in the seals of the present invention provides for positive clamping of the sealing element and accurate positive control of the bend point of the sealing element. In connection with this latter feature, the accommodation of extrusion of the sealing element within the mounting groove due to clamping is also of material importance in connection with accurate bend point control. The seals make use of a minimum number of parts and the location or positioning of the sealing element mounting portion may be varied substantially to meet the requirements of different applications. These seals can be readily formed for either internal and external sealing action. The sealing element mounting portion is readily formed using standard equipment and procedures and the configuration thereof accommodates variations in such procedures without attendant loss in operational efficiency. The design is particularly adapted for use with fluorocarbon materials thus permitting advantageous use of the unique properties of such materials while overcoming special problems arising from such use.

Obviously certain modifications and variations of the invention as hereinbefore set forth may be made without departing from the spirit and scope thereof, and therefore only such limitations should be imposed as are indicated in the appended claims.

I claim:

1. A seal formed from annular elements and comprising a flexible sealing element of at least substantially incompressible material and a sealing element mounting member, said sealing element mounting member including a relatively rigid but permanently deformable sealing element mounting groove defining portion positioned along a periphery of said mounting member, said groove defining portion in cross section being of semi-cylindrical internal configuration having an opening through which a peripheral portion of said sealing element is received and projects substantially into said groove defining portion, said opening being defined by a terminating leg portion which is integral with a bowed portion which presents a curvilinear bearing surface which projects toward the terminus of said leg portion and which is partially defined inwardly of said groove defining portion by a reentrant area forming a part of said groove defining portion, said bearing surface being located in spaced relation with the terminus of said leg portion, said peripheral portion of said sealing element being expanded in said groove defining portion wherein the total available volume at least equals the total expanded peripheral portion of said sealing element, said expansion of said sealing element being caused by clamping of said sealing element inwardly of said peripheral portion and within said opening by constricting action between the terminus of said leg portion and said bearing surface, the portion of said sealing element projecting from said mounting member being of relatively thin flexible material for ready flexing relative to said mounting member as controlled by contact of said projecting portion with said leg portion and bearing surface, the reentrant area of said groove defining portion being in backed up engagement with an annular area of said mounting member outwardly of said periphery thereof.

2. The seal of claim 1 wherein the portion of said sealing element projecting from said mounting member along its other periphery is formed with a double lip sealing portion defined by a leading lip backed up by an axially spaced lip, said lips being dimensioned for independent sealing action on a surface to be sealed.

3. The seal of claim 1 wherein said groove defining portion has received therein in clamped engagement with said peripheral portion of said sealing element a washer element which projects beyond the terminus of said leg portion to function with said leg portion and said bearing surface to clamp said sealing element.

4. The seal of claim 1 wherein a pair of flat washer-like sealing elements are mounted in said groove defining portion with projecting flexible sealing lip portions arranged for flexing in opposite axial directions, and an annular washer-like member having a peripheral portion is received in said groove defining portion between said sealing elements in clamped relation therewith, an opposite peripheral portion of said washer-like member projecting from said groove defining portion and terminating in an annularly arranged axially directed flange which engages the inner face of one of said sealing elements intermediate the clamped and freely flexible peripheral portions thereof to provide for controlled flexure thereof.

5. The seal of claim 1 wherein annular spring means is received in said groove defining portion in clamped overlying relation with said sealing element and projects from said groove defining portion in engagement with said sealing element to resiliently urge the same toward a flat radial plane in the installed condition of said seal.

6. A seal formed from annular elements and comprising a casing of relatively rigid but deformable material and having cooperating axial and radial portions, the radial portion of said casing including a peripheral sealing element mounting portion defined by a marginal area reversely extending along said radial portion in arcuate inwardly extending engagement therewith spaced inwardly from the terminus of said radial portion, said marginal area extending axially outwardly from said radial portion adjacent the area of engagement therewith and terminating in a radially extending leg portion which at least approaches said reversely extending marginal area toward overlying relation therewith and which is in spaced relation thereto, said sealing element mounting portion having a radially directed opening defined between the terminus of said leg portion and the arcuate juncture of said reversely extending marginal area with said radial portion, said arcuate juncture presenting an axially projected curvilinear bearing surface at least partially defined by an internal reentrant area formed by the engagement of said reversely extending marginal area with said radial portion, and a flexible sealing element of at least substantially incompressible material having a peripheral marginal portion received in said sealing element mounting portion and extending radially therefrom to define a projecting flexible sealing lip portion, said peripheral marginal portion of said sealing element being expanded in said sealing element mounting portion as a result of said sealing element being compressively clamped in said opening by constricting action of the terminus of said leg portion and the bearing surface of said arcuate juncture.

References Cited by the Examiner

UNITED STATES PATENTS

| | | | |
|---|---|---|---|
| 2,089,461 | 8/1937 | Winter | 277—50 |
| 2,233,624 | 3/1941 | Magnesen | 277—50 X |
| 2,690,360 | 9/1954 | Young | 277—169 X |
| 2,836,474 | 5/1958 | Mosher. | |

FOREIGN PATENTS

| | | |
|---|---|---|
| 1,185,604 | 10/1959 | France. |
| 546,260 | 7/1942 | Great Britain. |
| 602,792 | 6/1948 | Great Britain. |

LAVERNE D. GEIGER, *Primary Examiner.*

EDWARD V. BENHAM, SAMUEL ROTHBERG, LEWIS J. LENNY, *Examiners.*

N. JOHNSON, L. RANEY, J. MEDNICK,
*Assistant Examiners.*